us008656369B2

(12) United States Patent
Allen et al.

(10) Patent No.: US 8,656,369 B2
(45) Date of Patent: Feb. 18, 2014

(54) TRACING FLOW OF DATA IN A DISTRIBUTED COMPUTING APPLICATION

(75) Inventors: Paul V. Allen, Rochester, MN (US); Henrique Andrade, Croton-on-Hudson, NY (US); Wim De Pauw, Scarborough, NY (US); Bugra Gedik, White Plains, NY (US); Andy L. Frenkiel, Irvington, NY (US); Michael Donald Pfeifer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 12/785,916

(22) Filed: May 24, 2010

(65) Prior Publication Data
US 2011/0289301 A1 Nov. 24, 2011

(51) Int. Cl.
*G06F 9/44* (2006.01)

(52) U.S. Cl.
USPC .......................................... 717/132

(58) Field of Classification Search
USPC .......................................... 717/132
See application file for complete search history.

(56) References Cited

U.S. PATENT DOCUMENTS

| 6,817,010 | B2* | 11/2004 | Aizenbud-Reshef et al. | 717/127 |
|---|---|---|---|---|
| 7,197,571 | B2* | 3/2007 | Sarkar et al. | 709/237 |
| 7,277,702 | B2* | 10/2007 | Ropolyi et al. | 455/433 |
| 7,299,458 | B2* | 11/2007 | Hammes | 717/133 |
| 7,962,709 | B2* | 6/2011 | Agrawal | 711/162 |
| 8,423,965 | B2* | 4/2013 | Goel et al. | 717/126 |
| 2004/0015846 | A1* | 1/2004 | Haisraeli | 717/115 |
| 2004/0168155 | A1* | 8/2004 | O'Farrell et al. | 717/129 |
| 2005/0166184 | A1* | 7/2005 | Takao | 717/117 |
| 2009/0064186 | A1* | 3/2009 | Lin | 719/315 |

FOREIGN PATENT DOCUMENTS

CN 1286431 A 3/2001

OTHER PUBLICATIONS

Kramer et al.. "The Combining DAG: A Technique for Parallel Data Flow Analysis", Aug. 1994, IEEE, vol. 5, No. 8.*
Peters et al., "Automated Object-Flow Testing of Dynamic Process Interaction Models", 2001, Simulation Conference.*

* cited by examiner

*Primary Examiner* — Wei Zhen
*Assistant Examiner* — Junchun Wu
(74) *Attorney, Agent, or Firm* — William Stock; Ryan, Mason & Lewis, LLP

(57) ABSTRACT

A method is provided for tracing dataflow in a distributed computing application. For example, the method includes incrementally advancing a dataflow in a dataflow path of one or more dataflow paths according to two or more directives encoded in two or more data messages. The method further includes performing the two or more directives. The dataflow path includes one or more operators including at least one merge operator operative to merge the two or more data messages and merge the two or more directives. One or more of the incrementally advancing of the dataflow and the performing of the two or more directives are implemented as instruction code performed on a processor device.

22 Claims, 8 Drawing Sheets

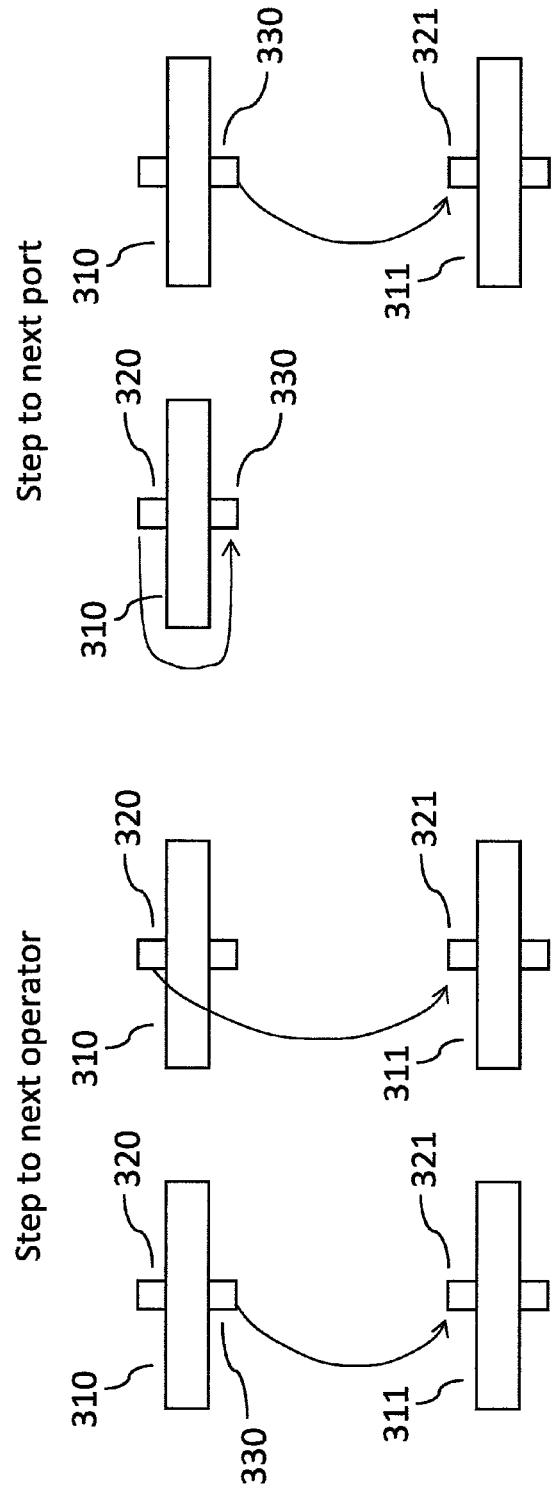

TRACING FLOW OF DATA IN A DISTRIBUTED COMPUTING APPLICATION

This invention was made with Government support under Contract No.: H98230-07-C-0383 awarded by Department of Defense. The Government has certain rights in this invention.

FIELD OF THE INVENTION

The present invention relates generally to distributed computing applications and, more particularly, to debugging flow-based distributed computing applications according to data-paths of the distributed flow-based applications.

BACKGROUND OF THE INVENTION

Distributed computing is performed on distributed computing systems. A distributed system may comprise multiple autonomous computers communicating through a computer network. The computers may interact with each other in order to achieve a common goal. A distributed application is a computer program that runs on a distributed system. For example, a distributed application running on a distributed computing system may be used to solve computational problems that are divided into a plurality of tasks. Each task may be solved by one computer of the distributed computing system.

Applications are computer software operable to help a user perform a singular or multiple related specific tasks. Typical examples are word processors, spreadsheets, media players and database applications. Applications may be, for example, execution-flow based or data-flow based.

Debugging is a methodical process of finding and reducing a number of bugs or defects in an application in order to make the application behave as intended. Debugging may involve interactive debugging, control flow, integration testing, log files, monitoring, memory dumps and/or statistical process control. Conventional debugging may step through, follow or manipulate an execution flow of an application.

Tracing is a process related to debugging in which the flow of execution through an application or between components of a distributed application is tracked by the application developer. When tracing, developers follow or record the execution flow or changes to the data as it transits specific parts of the application, or responds to specific application events. The data captured while tracing may include snapshots of the application's state as well as timestamps. This information is helpful for enhancing application understanding and diagnosing performance problems or data transformation errors.

SUMMARY OF THE INVENTION

Principles of the invention provide, for example, methods, apparatus and systems for tracing dataflow in a distributed computing application.

In accordance with a first aspect of the invention, a method for tracing dataflow in a distributed computing application is provided. The method comprises incrementally advancing a dataflow in a dataflow path of one or more dataflow paths according to two or more directives encoded in two or more data messages. The method further comprises performing the two or more directives. The dataflow path comprises one or more operators comprising at least one merge operator operative to merge the two or more data messages and merge the two or more directives. One or more of the incrementally advancing of the dataflow and the performing of the two or more directives are implemented as instruction code performed on a processor device.

In accordance with a second aspect of the invention, a system for tracing dataflow in a distributed computing application is provided. The system comprises modules for implementing the above method.

In accordance with a third aspect of the invention, apparatus for tracing dataflow in a distributed computing application is provided. The apparatus includes a memory and a processor coupled to the memory. The apparatus is configured to perform the above method.

In accordance with a fourth aspect of the invention, an article of manufacture for tracing dataflow in a distributed computing application is provided. The article of manufacture is tangibly embodying a computer readable program code which, when executed, causes the computer to carry out the above method.

Advantageously, an illustrative embodiment of the present invention may be utilized by a debugging tool to step through and trace a data-path of a distributed flow-based application. The debugging tool may, for example, localize and diagnose application defects for large-scale distributed applications that process data at high frequencies, while only minimally impacting the performance of the application. The debugging tool may be applied to, for example, stock market analytics operating at market transaction rates and monitoring manufacturing systems. The debugging tool may be used in conjunction with tools that visualize the topology of the distributed application and data flow paths, performance and memory profiling tools, and source code debugging tools.

These and other features, objects and advantages of the present invention will become apparent from the following detailed description of illustrative embodiments thereof, which is to be read in connection with the accompanying drawings.

BRIEF DESCRIPTION OF THE DRAWINGS

FIGS. 3A and 3B are diagrams illustrating application flows according to a step-to-the-next-operator directive of a flow-based application according to an embodiment of the invention.

FIGS. 3C and 3D are diagrams illustrating application flows according to a step-to-the-next-port directive of a flow-based application according to an embodiment of the invention.

DETAILED DESCRIPTION OF THE INVENTION

Figure 1B:
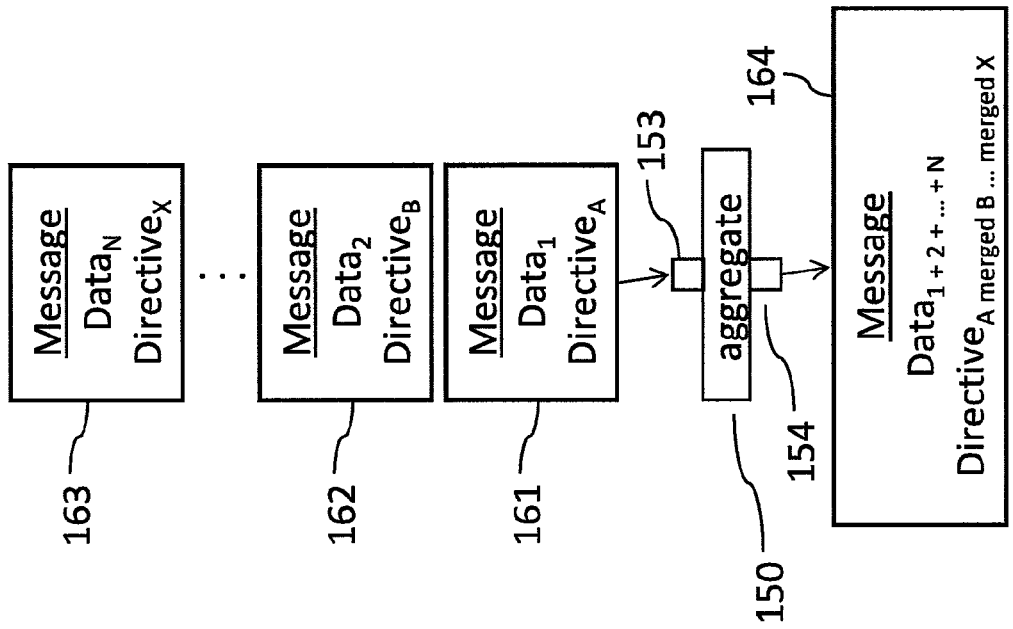
FIG. 1B is a diagram illustrating an aggregate operator implementing a merge operation according to an embodiment of the invention.

Principles of the present invention will be described herein in the context of illustrative embodiments of methods, apparatus and systems for debugging, visualizing, profiling, and understanding computing application according to a datapath in a flow-based computing application. It is to be appreciated, however, that the principles of the present invention are not limited to the specific apparatus, systems and methods illustratively shown and described herein. Rather, the principles of the invention are directed broadly to techniques related to tracing data messages in a flow-based computing application. For this reason, numerous modifications can be made to the embodiments shown that are within the scope of the present invention. That is, no limitations with respect to the specific embodiments described herein are intended or should be inferred.

As used herein, the term application generally refers to a computing application which typically performs or helps to perform one or more specific tasks. Applications are usually expressed in software code or instructions (e.g., software code stored in memory and performed by a processor device coupled to the memory), but may be expressed in firmware. Applications are usually considered to be exclusive of system software (infrastructure) or middleware (computer services/processes integrators). System software and middleware are involved in integrating various capabilities of a computing device, but typically do not directly direct the capabilities in performing tasks that benefit the user. An application typically applies or directs the capabilities to perform tasks for a user.

As used herein, a distributed application generally refers an application configured to run on a system of multiple autonomous computing devices (e.g., computers), for example, computing devices that communicate through a computer network (e.g., the Internet). The computing devices interact with each other in order to achieve a common goal, for example, the goal of the distributed application. Distributed applications may comprise, for example, hundreds of operators, thousands of possible data-paths and millions of messages per second.

An application comprises a collection of operators (e.g., components for performing specific computing functions) that carry out data transformations (such as filtering, aggregations, correlations, etc.) or specific data analytics (such as data classification, data mining, etc.).

As used herein, a message generally refers to a message passed within software (e.g., an application or software supporting an application). The message may or may not be directly human-readable. A hop refers to a connection between two operators. The hop count associated with a message is typically incremented when the message is transferred from the output port of an operator to an adjacent input port of an operator.

As used herein, dataflow applications include applications based on dataflow principles and architecture, and may be, for example, modeled as a directed graph of data flowing between operations.

As used herein, flow-based applications may be considered to be, for example, applications comprising one or more networks of asynchronous, reusable, components transforming streams of formatted data objects (i.e., data streams). For example, flow-based applications may comprise one or more networks of "black box" processes which exchange data across predefined connections (e.g., one-way connections) by message passing. These black box processes may be, for example, reconnected in different ways to form different applications without having to change the black box processes internally. Thus, flow-based applications are component-oriented. Flow-Based applications are based on the concept of multiple asynchronous processes communicating by means of data streams. For example, a flow-based application may be viewed as a system of data streams being transformed by processes. None of the processes need be aware of what other processes are coupled to it. Communication between processes is according to connections defined external to the processes, allowing components (e.g., processes) to be considered to be "black boxes."

Flow-based applications may be considered, for example, a type of dataflow application; therefore, as used herein, references to flow-based applications are implicitly references to dataflow applications. Dataflow and flow-based applications may be, for example, distributed applications.

As used herein, a breakpoint includes an intentional interrupting point (e.g., stopping or pausing point) in a program put in the program for, for example, debugging purposes. More generally, a breakpoint is a means of acquiring knowledge about a program during execution of the program. During the interruption, a programmer may inspect the test environment of the program (logs, memory, files, etc.) to obtain information (e.g., to find out whether the program is functioning as expected). A breakpoint may be non-conditional, halting operation at a specified breakpoint without condition. Alternately, a breakpoint may include one or more conditions that determine when execution of the program should be interrupted. A conditional breakpoint may be conditional on an operation, for example, a reading, writing, or modification of a specific memory location. As used herein, a watchpoint generally refers to a conditional breakpoint that is triggered when a value of a data variable changes.

A tracepoint is a means of recording the internal state or behavior of an application without interrupting the application's execution. For example, tracepoints may record when a particular instruction is executed and may also record the value of the program's data variable. Like breakpoints, tracepoints can be conditional or non-conditional.

It should be noted that, as used herein, the term debug directive encompasses encodings of both debug operations, such as setting a breakpoint, and trace operations, such as "cache intercepted data message." The term directive may generally refer to one or more commands, instructions, orders, or directions that encode one or more actions, operations, or processes, for example, such actions, operations, or processes being associated with tracing and/or debugging techniques.

Embodiments of the invention comprise methods and tools to step-through and trace one or more data-paths of a distributed dataflow application (e.g., a Message Passing Interface (MPI) based application, a stream processing application, etc.). The application may be incrementally performed (i.e., run) or advanced, the data-path of messages may be traced, directives that enable dataflow-based debugging according to the incremental execution and the tracing of the data-paths of messages may be encoded, and debug directives may be merged and forwarded. The merging and forwarding may be implemented by application programming interfaces (APIs) and invoked by code generated by a flow-based application compiler or invoked by custom code implemented by a developer.

Such methods, tools and embodiments of the invention may be used for, for example, debugging of applications. One embodiment of the invention is a flow-based debugger used for debugging flow-based applications according to methods, systems and techniques of the invention (e.g., tracing data messages in a flow-based distributed application).

Advantageously, using the debugging tool, a developer can debug, inspect and interact with the dataflow application at a level of abstraction that is consistent with a programming model employed by the application. Such programming models may comprise, for example, operators that perform data transforms (e.g., annotation, join, and aggregation), connections between operators on which the data messages flow, and/or sending and receiving data and control messages.

Techniques for debugging distributed applications include analyzing system and application trace messages, invoking a source code debugger to interrupt execution flow, and inspecting the application state, including objects containing message data, using low level capabilities of the source code debuggers. Traditional debug techniques are based on execution flow of the application as opposed to the dataflow of the application. Moreover, traditional techniques may involve a developer adjusting the location or content of trace messages by updating or rebuilding application code. Thus, traditional techniques may require access to source code, a relatively deep knowledge of application internals, and a relatively deep knowledge of related distributed communication framework.

Methods of the present invention include, for example, debugging according to dataflow, herein termed dataflow debugging. For dataflow debugging, prior knowledge of the data-path is not required to set breakpoints and intercept messages. In applications consisting of hundreds of operators and/or thousands of connections, discerning the data-path may be hard and prone to errors. These operators may, for example, split a dataflow by replicating and routing a single inbound message on multiple outbound connections, or aggregate multiple inbound data messages into fewer outbound data messages. Furthermore, dataflow debugging may avoid, for example, source code debugging which may be cumbersome for diagnosing problems specific to composition of application consisting largely of generated code.

Methods of the invention further include, for example, systems, mechanisms and software hooks for flexible and efficient debugging of applications, include mechanisms enabling application developers to track the dataflow, and include techniques for tracing (e.g., generating trace messages at input and output ports of an operator) and source debugging of operations along the data-path.

Methods of the invention may be integrated with traditional execution flow debugging techniques.

An embodiment of the invention comprises: (i) debug and tracing directives that are included in data messages of a dataflow application; (ii) mechanisms for generating additional source code instruments in the application to be debugged; and (iii) a dataflow debugger that intercepts and executes actions encoded in directives. The debugging actions encoded in the directives instruct the dataflow debugger to break execution flow when receiving debug directives encoded in data messages (e.g., to intercept the data message and block the corresponding dataflow path) and/or to trace the message. Tracing the message comprises logging content of the message and forwarding the message without blocking the application (i.e., without breaking execution flow). The embodiment also specifies rules for merging and reconciling debug directives received on input data messages to yield a composite output directive. Operations that combine data messages (e.g., join, split and aggregation operations) may exploit these rules to map multiple input directives to a single output directive. The debugging actions are analogous to the definition of breakpoints and tracepoints that may be provided by a source code debugger, like the GNU debugger (GDB). However, unlike GDB, the dataflow debugger of the embodiment of the invention does not step through the execution flow of an application, but steps through the dataflow of an application.

As previously mentioned, operators (e.g., components for performing computing functions) may carry out data transformations (such as filtering, aggregations, correlations, etc.) or specific data analytics (such as data classification, data mining, etc.). Operators can receive data messages from other operators as well as produce data messages to be used or consumed by other operators. In many, but not necessarily all, cases, the receipt of a data message by an operator triggers the execution of an operator's internal computational logic. Using a dataflow debugger of an embodiment of the invention, a developer may stop on a boundary of an operator (e.g., the operator entry point when, for example, receiving data messages or the operator output when, for example, producing data messages) in the dataflow path and observe the transformations to data of the data message caused by applying logic of the operator to the incoming data message(s).

In addition to intercepting and displaying the contents of the data message(s) at the operator boundaries, embodiments of the invention comprise a mechanism for supporting the update of message data attributes, which facilitate unit testing, validation of boundary conditions, and carrying out what-if analysis.

By way of a non-limiting example only, a method of the invention incrementally executes and traces a dataflow in a distributed application. Debugging directives are encoded in data messages. The debugging directives may comprise directives for incrementally advancing the dataflow to a next operator and directives for incrementally advancing the dataflow to a next port. There are rules for merging and forwarding the debug directives when processed by operators that join, split, aggregate and forward data messages. A dataflow debugger intercepts, interprets and executes the directives contained in the data messages.

The rules for merging and forwarding the debug directives comprise merge rules by which operators which combine input data messages, each of which contain debug directives, generate a single directive embodied in the output data message. Examples of such operators include join and aggregate. The rules for merging and forwarding the debug directives further comprise a rule by which a reset debug directive cancels a debug directive that is in process of being merged by operators that join and aggregate data messages.

Rules for fanning out and forwarding debug directives comprise split rules by which operators which route a single input data message to one or more output data messages and which replicate the debug directive to each output message.

The dataflow debugger can encode and insert debug directives in a data message and can delete debug directives from a data message. The debugger can further report the termination of dataflow when pending the completion of a step to the next operator or a step to the next port and/or when the data message is discarded by the operator.

Advantageously, embodiments of the invention simplify the debugging of large scale applications (e.g., distributed, flow-based and/or dataflow applications). Applications that consist of hundreds of operators and thousands of data-paths can be very hard to debug because it is difficult to anticipate the path of a particular dataflow. For example, in large applications, some fanout operators forward a data message to one of thousands of downstream operators. Methods of the invention enables the developer to incrementally step through the dataflow or message flow of the application and follow the transformation of a particular sequence of messages (e.g., data messages) without needing to understand the details of a topological organization of operators of an application (e.g., routing behavior of operators). For example, methods of the invention may validate correctness and performance and diagnose defects of applications by inspecting and/or tracking specific data through a chain of transformations (e.g., transformations that combine data), and may debug large-scale distributed applications by localizing and diagnosing application defects for large-scale distributed computing applications that process data at high frequencies. Minimizing impact on application performance and or resources is a feature of the invention.

Embodiments of the invention may be relatively inexpensive to implement because only unidirectional point-to-point interaction between dataflow debuggers, using existing flow-based and simple directives, are used.

Methods of the invention minimize negative impact on performance and/or resources. Advantageously, there may not be a degradation of resources or performance when methods of the invention (e.g., debugging methods) are not enabled or when the application is running in production mode. When dataflow debuggers are not enabled or when in production mode, the debug directives are not inserted in the data messages and the operator code will neither execute nor contain the code that combines and forwards the directives.

An embodiment of the invention may comprise modules (e.g., software modules), for example, an encoding module, an API module, a compiler module, a dataflow module and a dataflow debugger module. The embodiment of the invention further comprises methods used by flow-based operators for forwarding and merging directives.

The encoding module is operative to encode debug and tracing directives for data messages. By way of example only, the encoding provides a sequence of bits that are part of a message carrying the application data.

The API module is operative to initialize debug and tracing directives in messages and to implement merge and reconciliation rules that map multiple input debug directives coming from several incoming data messages to a single output directive encoded in the output data message that is produced as a result of carrying out an operation on the multiple incoming data messages. The API module is also operative to implement fanout rules that replicate the debug and trace directives in the output data messages that are produced by carrying out an operation on an incoming data message.

One or more APIs of the API module may be used by the dataflow operators. The compiler module may generate code to merge, fanout and forward debug directives between an operator inputs and operator outputs, and may generate the dataflow debugging operator code. The generated code may comprise, for example, logic specific to the algorithm implemented by the operator to handle merging and forwarding the debug directives. The merge and fanout functions are realized by invoking the APIs described above.

A dataflow debugger module operative to perform actions specified by debug directives contained in the data messages, and can encode, intercept, and interpret debug directives contained in data messages. The debugger may intercept data messages as they are received on an input port of an operator and/or sent by an output port of the operator. A developer may use an interactive interface to define new debug directives which are inserted and forwarded in the data message.

Using the above modules, methods of the invention may be defined for incrementally controlling the execution for the application dataflow for a particular message to the next port or operator in the data-path. Using the above modules, a trace directive may be implemented to enable the dataflow debuggers to cache and optionally log the contents of the data message without suspending execution of the application. A reset directive is provided so that developers can cancel trace and step directives that are in progress.

As disclosed, embodiment of the invention may derive a data-path through in the data-flow application. Methods of deriving the data-path may comprise, for example, operators having code that inserts trace directives in messages input to an operator (input tuples) and transfer those directives to the corresponding messages output from the same operator (output tuples). Alternately or additionally, methods of deriving the data-path may comprise inferring a data path between input and output ports of an operator by evaluating properties of data-flow that are external to the implementation of the operator. The latter method may be used, for example, to track data-flow across operators in cases where the tracking logic was not introduced into the operator.

Merging and forwarding debug directives may further comprise forwarding, passing or transferring one or more debug directives from one or more input ports to one or more output ports of an operator by inferring an association or relationship between the one or more input ports and the one or more output ports according to inference rules associated with evaluating externally observable behavior of the operator. Inference rules may include, for example, temporal relationships, data relationships or a combination of temporal and data relationships.

Temporal relationships may be used between messages received and subsequently sent by an operator to infer a data-flow path between one or more input ports and one or more output ports of the operator. The relationships may be expressed as a set of rules and constraints. The rules may be used to identify possible causal relationships between input and messages, and the constraints may define boundary conditions used by the rules. An example of such a rule is "an output message is causally related to an input message if the output message is produced between X and Y seconds after receiving an input message." The values of X and Y constitute the constraints used to parameterize the rule.

Methods involving temporal relationships may be associated with, for example, graphical user interfaces that enable the user to: (i) select an operator in the flow-based application; (ii) for that operator, select among a set of generally useful temporal rules; (iii) parameterize the constraints for those rules; and (iv) use various reports, and view the results of applying those rules to data.

Data relationships may be used to compare a data model and data values of messages received and subsequently sent by an operator to infer a data-flow path between one or more input ports and one or more output ports of the operator. The comparison may comprise a set predicates that evaluate the data models and values. For example, a predicate that compares the value of "id" attributes contained in the input and output messages may be used to infer a data flow path between an input port and an output port.

Methods involving data relationships may be associated with, for example, graphical user interfaces that display data models associated with the input and output ports of an operator, and enables a user to specify predicates that compare the data model and data values contained in input and output messages.

Figure 1A:
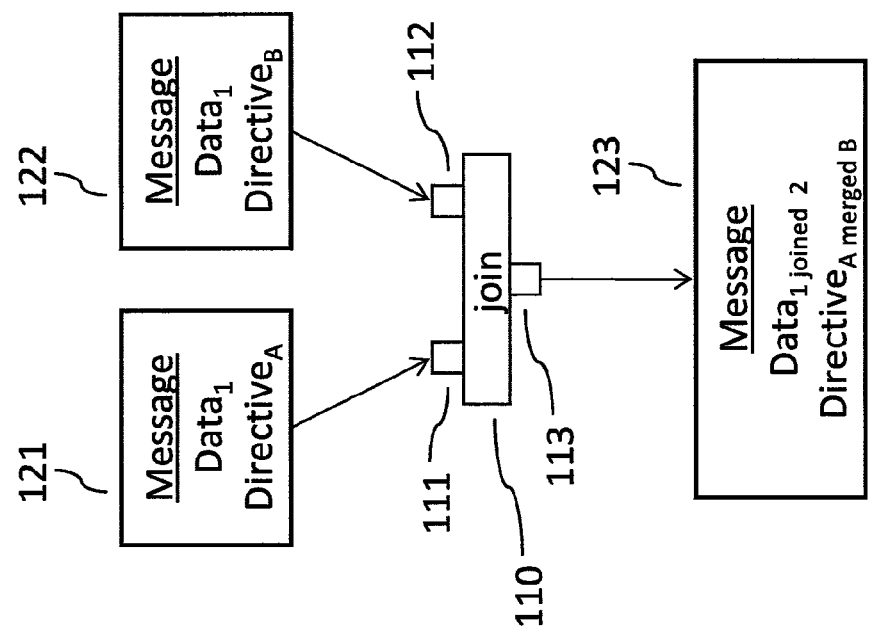
FIG. 1A is a diagram illustrating a join operator implementing a merge operation according to an embodiment of the invention.

FIGS. 1A and B illustrate a merge operation as implemented by a join operator (FIG. 1A) and an aggregate operator (FIG. 1B). FIG. 1A shows a join operator 110 comprising input port 111, input port 112 and output port 113. Messages 121 and 122 are received by input ports 111 and 112, respectively. Message 121 comprises $Data_1$ and $Directive_A$. Message 122 comprises $Data_2$ and $Directive_B$. The join operator 110 functions to join messages 121 and 122 to form message 123 comprising $Data_{1\ joined\ 2}$ and $Directive_{A\ merged\ B}$. $Data_{1\ joined\ 2}$ comprises a combination of $Data_1$ and $Data_2$ (e.g., all $Data_1$ plus all of $Data_2$). $Directive_{A\ merged\ B}$ comprises a combination of $Directive_A$ and $Directive_B$.

FIG. 1B shows an aggregate operator 150 comprising input port 153 and output port 154. Messages 161, 162 and 163 are received by, and queued at, input port 153. Message 161 comprises $Data_1$ and $Directive_A$. Message 162 comprises $Data_2$ and $Directive_B$. Message 163 comprises $Data_3$ and $Directive_C$. The aggregate operator 150 functions to aggregate messages 161, 162 and 163 to form message 164 comprising $Data_{1\ aggregated\ 2\ aggregated\ 3}$ and $Directive_{A\ merged\ B\ merged\ C}$. $Data_{1\ aggregated\ 2\ aggregated\ 3}$ comprises a combination of $Data_1$, $Data_2$ and $Data_3$ (e.g., all $Data_1$ plus all of $Data_2$ plus all of $Data_3$). $Directive_{A\ merged\ B\ merged\ C}$ comprises a combination of $Directive_A$, $Directive_B$ and $Directive_C$. The aggregate operator 150 has one input port and aggregates one or more input data messages to produce an output data message. Aggregate operators may have any number of input ports for aggregating any number of messages.

Figure 2B:
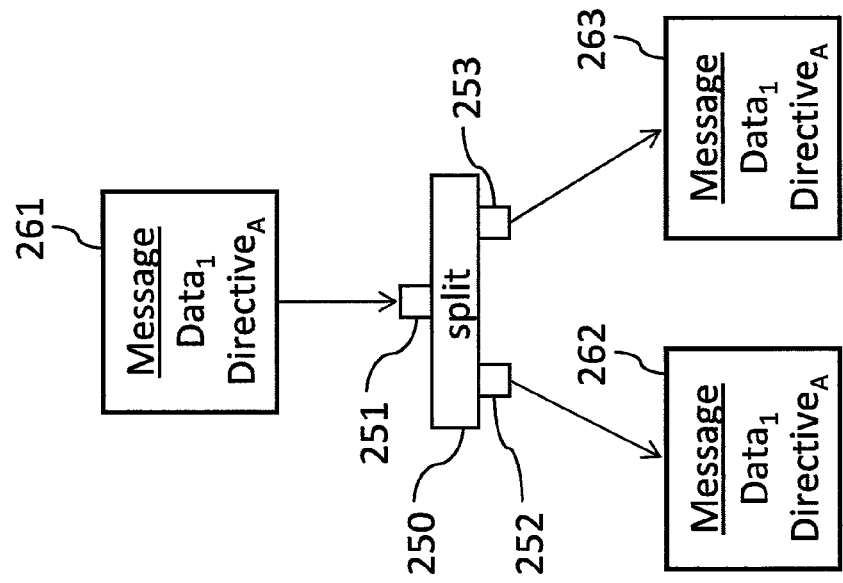
FIG. 2B is a diagram illustrating a split operator for implementing a fanout operation according to an embodiment of the invention.
Figure 2A:
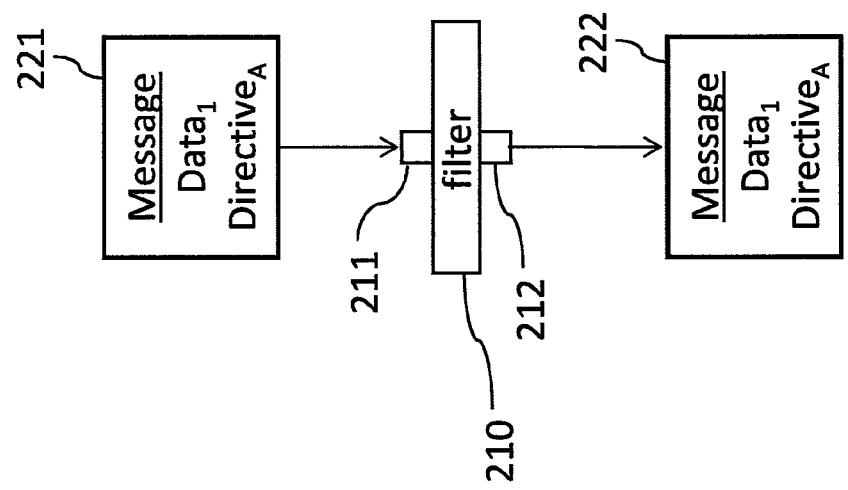
FIG. 2A is a diagram illustrating a filter operator implementing a forwarding operation according to an embodiment of the invention.

FIG. 2A shows a filter operator 210 which implements a forward operation according to an embodiment of the invention. The operator 210 comprises at least one input port 211, and output port 212. The operator 210 may, but does not necessary, further comprise any number of additional input ports and/or any number of additional output ports. The operator 210 has a function, for example, a forward function for forwarding a message such as message 221 comprising $Data_1$ and $Directive_A$. In this case, message 221 is forwarded as message 222 also comprising $Data_1$ and $Directive_A$. For another example, the operator 210 may function to more than just forward one or more messages, such as the split function of split operator 420a or 420b in FIG. 4. Split operators 420a and 420b selectively forward messages, routing messages to different output ports according to content of the message. Other operators 210 may filter out certain messages while forwarding other messages. Other functions are also contemplated wherein the operator 210 forwards messages.

FIG. 2B shows a split or replicate operator 250 which implements a fanout operation according to an embodiment of the invention. The operator 250 comprises one input port 251, and a plurality of output ports 252 and 253. The operator 250 receives message 261 at its input port 251. Message 261 comprises $Data_1$ and $Directive_A$. In this case, message 261 is replicated to form messages 262 and 263 at output ports 252 and 253. Messages 262 and 263 each comprise $Data_1$ and $Directive_A$. For another example, the operator 250 may function to more than just replicate one or more messages. For example, one or more of the output messages may contain added or modified content relative to the input message.

FIGS. 3A, 3B, 3C and 3D illustrate application flows according to debug directives of a flow-based application according to an embodiment of the invention. Application flows are shown from either an input port (e.g., input port 320) or an output port (e.g., output port 330) of an operator (e.g., operator 310) to an input port or an output port of the same or a different operator. The directives may indicate, for example, step-wise execution of the application. The directives are a step-to-the-next-operator (STNO) directives and step-to-the-next-port (STNP) directives. The STNO directive activates a breakpoint when a message is received at the input port of the next operator in the flow of the application. The STNP activates a breakpoint when the message is received at the next port in the flow of the application.

The application flow corresponding to the STNO directive is shown in FIGS. 3A and 3B. In FIG. 3A, the application flow proceeds from an output port 330 of a first operator 310 to an input port 321 of a second operator 311. In this case, the STNO directive is performed after intercepting or following a message on the output port 330 of the first operator 310. In FIG. 3B, the application flow proceeds from an input port 320 of a first operator 310 to an input port 321 of a second operator 311. In this case, the STNO directive is performed after intercepting or following a message on the input port 320 of the first operator 310. In FIGS. 3A and 3B, a breakpoint on the input port 321 of the second operator 311 is activated when the input port 321 of the second operator 311 receives the message.

The application flow corresponding to the STNP directive is shown in FIGS. 3C and 3D. In FIG. 3C, the application flow proceeds from an input port 320 to an output port 330 of the same operator 310. In this case, the STNP directive is performed after intercepting or following a message on the input port 320 of the operator 310. In FIG. 3C, a breakpoint on the output port 330 of the operator 310 is activated when the output port 330 of the operator 310 receives the message. In FIG. 3D, the application flow proceeds from an output port 330 of a first operator 310 to an input port 321 of a second operator 311. In this case, the STNP directive is performed after intercepting or following a message on the output port 330 of the first operator 310. In FIG. 3D, a breakpoint on the input port 321 of the second operator 311 is activated when the input port 321 of the second operator 311 receives the message.

A compiler option, the distributed debug/trace option, activates when enabled and suppresses when disabled the generation of code that merges, fans out, and forwards debug directives. The compiler has another option, the debug/trace activate option. The debug/trace active option, when activated, enables tracking of data message according to embodiments of the invention (e.g., activates the flow-based debugger). Otherwise, if compiled with the distributed debug/trace option, the debugger directives would transit the operator but not activate the debugger.

A directive may comprise a plurality of fields, for example, fields indicating debug probe point types (e.g., breakpoint and tracepoint fields), fields indicating debug action (e.g., activate or reset fields), fields indicating step directive (e.g., next port and next operator fields), and fields indicating trace control (e.g., input port, output port, all ports, maximum hops, current hops, and identification (id)).

Table 1 gives an exemplary description of encoding directives for a flow-based debugger according to an embodiment of the invention.

TABLE 1

| Field Type | Field | (Byte:Bit) of Directive | Description |
|---|---|---|---|
| Debug probe point type | breakpoint | 1:0 | Suspend operator when intercepting this data message. |

TABLE 1-continued

| Field Type | Field | (Byte:Bit) of Directive | Description |
|---|---|---|---|
| | trace-point | 1:1 | Cache intercepted data message. Forward this debug directive, reset bits for breakpoint and step directive. |
| Debug action | activate | 1:2 | Execute specified probe point types on this message. |
| | reset | 1:2 | Reset directive for this message and any message that merges this directive. |
| Step directive | next port (STNP) | 1:3 | Process by debugger at next port on flowbased. |
| | next operator (STNO) | 1:4 | Process by debugger at input port of next operator on flow-based. |
| Trace control | input port | 1:5 | Cache intercepts message at input port. |
| | output port | 1:6 | Cache intercepts message at output port. |
| | all ports | 1:5-6 | Cache intercepts message at input and output ports. |
| | max hops | 2-3 | Maximum number of hops |
| | current hop | 4-5 | Current hop |
| | id | 6-7 | A unique identifier useful for correlating related trace messages |

Embodiments of the invention are applicable to, for example, stock market analytics operating at market transaction rates, monitoring manufacturing systems (e.g., early identification of anomalies that may imply defects), stream processing, complex event processing, and high performance computing message passing interface (HPC MPI) based applications.

Figure 4:
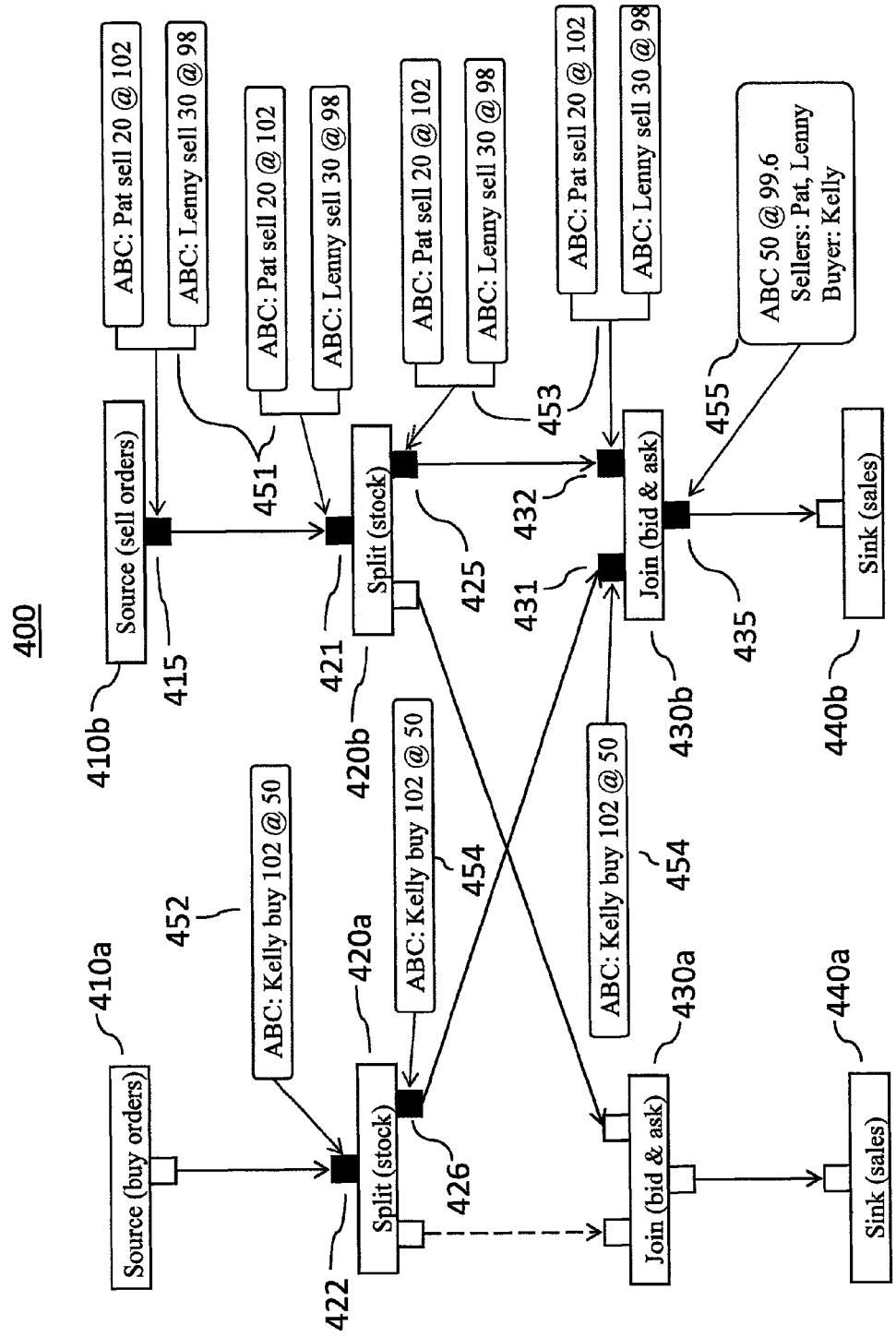
FIG. 4 is a diagram showing data-flow and operators of a flow-based application for processing stock orders according to an embodiment of the invention.

FIG. 4 illustrates data-data flow and operators of an exemplary application 400 for processing stock orders according to an embodiment of the invention. The application 400 is used below to illustrate a method for tracing a dataflow of an application. The dataflow may be traced by, for example, a debugger used for debugging the flow-based application 400 by tracing the dataflow of application 400. The application 400 is a distributed, flow-based application and is, therefore, also a dataflow application. The application 400 processes bids for purchasing and selling of stock. The application 400 comprises source operators 410a and b, split operators 420a and b, join operators 430a and b and sink operators 440a and b. Each operator comprises one or more input ports and one or more output ports. An input port is indicated by an open or solid-filled square located on top of the symbol for the operator. An output port is indicated by an open or solid-filled square located on the bottom of the symbol for the operator. An open square indicates that a breakpoint has not been set or assigned at the corresponding port. A solid-filled square indicates that a breakpoint is assigned, at the corresponding port, during the stepping through of the at least a portion of application 400.

Buy and sell orders are accepted at by source operators 410a and b, respectively. Source operator 410a is coupled to split operator 420a and source operator 410b is coupled to split operator 420b. Split operators 420a and b segregate the bids accepted by their respective source operators 410a and b according to stock symbols (e.g., ABC Company has stock symbol ABC). Each split operator 420a and b is further coupled to both join operators 430a and b. Join operators 430a and b each create transactions by joining or matching sell orders (i.e., bids to sell stock) provided by one or both of the split operators 420a and b with buy orders (i.e., bids to buy stock) provided by one or both of the split operators 420a and b. When the stock symbol, share price and number of shares match, the buy and sell orders are joined by join operator 430a or b to create a transaction. Join operator 430a is coupled to sink operator 440a and join operator 430b is coupled to sink operator 440b. Sink operators 440a and b perform the transaction created by the respectively coupled join operator 430a or b and close the sale of brokerage service for the respective transaction.

Communications between operators is according to the couplings shown and/or herein described and is in the form of data messages sent from an output port to an input port.

Certain breakpoints (e.g., conditional and/or non-conditional breakpoints) are defined or set at points in the application at sometime during the debugging. These breakpoints are 415, 421, 422, 425, 426, 431, 432, and 435. The breakpoints are located at input and/or output ports of operators, indicated by solid black squares located at the port of the breakpoint. For example, a breakpoint 415 is at the output port of source operator 410b.

Figure 5:
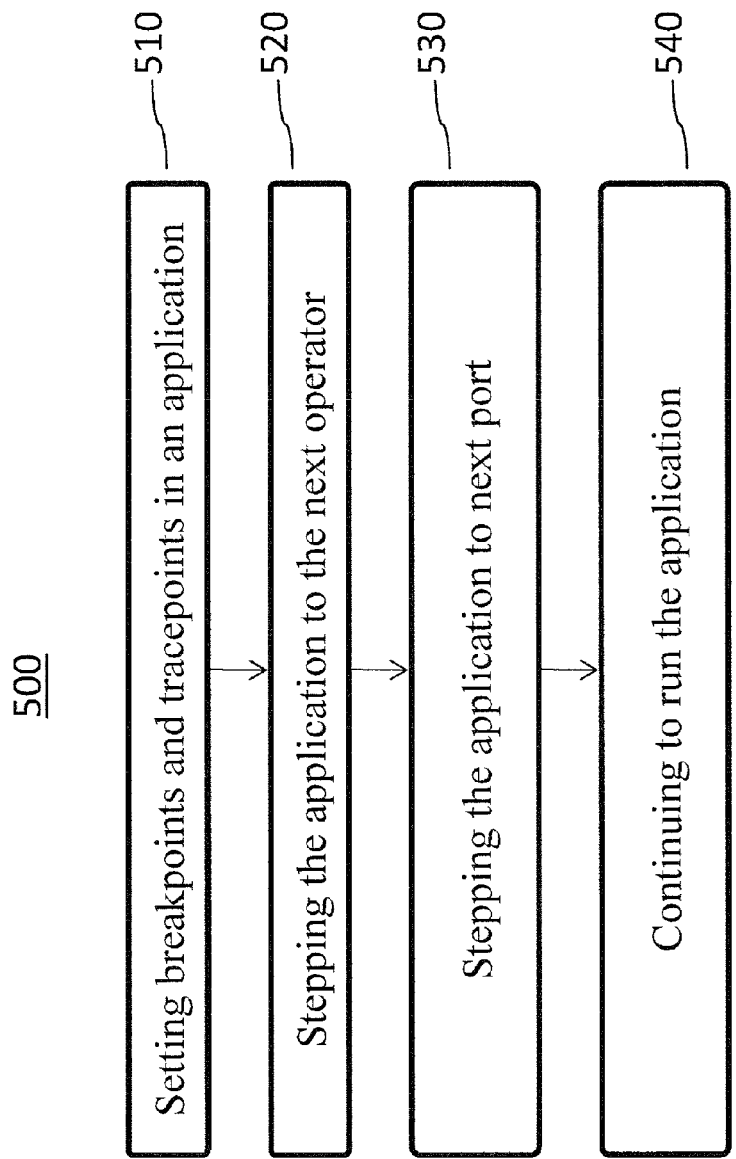
FIG. 5 is a flow diagram of a method for stepping through a flow-based application according to an embodiment of the invention.

FIG. 5 is a flow diagram for a method 500 for stepping through an application according to an embodiment of the invention. The application 400 is used to illustrate an exemplary use of the method 500.

Step 510 comprises setting and/or activating breakpoints and tracepoints at input and/or output ports of one or more operators in the application. The breakpoints and tracepoints may be conditional and/or non-conditional. The breakpoints and tracepoints may be set and/or activated by debug directives.

Step 520 comprises stepping the application to the next operator in order to follow a data-path (e.g., follow a message from one operator to another operator). Stepping the application may comprise running a relatively small portion of the application in order to proceed form one operator to a subsequent operator (e.g., from the output port of one operator to an input port of a subsequent operator). Stepping to the next operator may transfer a message or from one operator to another (e.g., from the output port of one operator to the input port of another port). Step 520 may be performed by or according to a STNO debug directive.

Step 530 comprises stepping the application to next port. Stepping to the next port may comprise running a relatively small portion of the application in order to proceed from an input port of an operator to an output port of the same operator. Stepping to the next port may perform the operation of the corresponding operator.

Step 540 comprises continuing to run the application. Step 530 may be performed by or according to a STNP debug directive.

Consider an exemplary sequence of the steps 510, 520, 530 and 540 in order to perform the application 400.

First, define a breakpoint at the output port of the source operator 410b that injects stock sell orders into the application 400. Run the application 400 and inspect data messages until an interesting sell offer is encountered on the output port of source operator 410b. The application may be run, for example, in a stepwise or piecemeal manner so that the user may examine each message as it appears at breakpoint 415. The user finds a data message of interest 451 that comprises two sell orders, one form Pat to sell 20 shares of ABC Company at $102 or more and the other from Lenny to sell 30 shares of ABC Company at $98 or more. When the user finds the data message 451 regarding the sell orders, the dataflow along the data-path comprising both source operator 410b and split operator 420b has stopped for the user to examine the data message.

Next, define a breakpoint 422 on the input port of the split operator 420a which segregates buy orders by stock symbol. Run application and inspect bids until a bid for ABC is received at the input split operator 420a. The user finds data message 452, a buy order from Kelly to buy 50 shares of ABC at $50 or less.

Step 520, step to the next operator, is performed by a STNO debug directive in the sell order data message 451. The data-flow comprising message 451 has now progressed to the input port of split operator 420b. Breakpoint 421 is set (step 510) according to the STNO directive.

Step 530, step to the next port, is performed by a STNP debug directive in the data message 451. The data-flow comprising message 451 has now progressed to the output port of split operator 420b where message 453 comprises the sell orders. Breakpoint 425 is set and activated (step 510) according to the STNP directive.

Step 530, step to the next port, is performed by a STNP debug directive in the data message 452. The data-flow comprising message 452 has now progressed to the output port of split operator 420a where message 454 comprises the buy order. Breakpoint 426 is activated (step 510) according to the STNP directive.

Step 520, step to the next operator, is performed by a STNO debug directive in the data message 454. The data-flow comprising message 454 has now progressed to a left input port of join operator 430b. Breakpoint 431 is activated (step 510) according to the STNO directive.

Step 520, step to the next operator, is performed by a STNO debug directive in the data message 453. The data-flow comprising message 453 has now progressed to a right input port of join operator 430b. Breakpoint 432 is activated (step 510) according to the STNO directive.

Step 530, step to the next port, is performed by a STNP debug directive in one or both data message 453 and 454. The data-flow comprising message 453 and the data-flow comprising message 454 are merged by the join operator to a common data-flow and a common data message 455 at the output port of the join operator 430b. The data flows are merged, thus causing the debug directives to be merged, resulting in a merged directive for breakpoint 435, which is activated (step 510) only if and when a join condition specified by the join operator 430b is satisfied.

Step 540 is performed. The application 400 is run so that the sink operator 440b performs the transaction and closes the sale of brokerage service for this transaction.

Note that when an application stops according to one or more breakpoints, the user may examine one or more messages at the one or more breakpoints. The messages appearing at breakpoints may be logged in memory, for example, a debugger message cache 650 (see FIG. 6).

As previously described, a breakpoint suspends the application when the condition of the breakpoint is met by the debug directive in the data message. Suspending the application may comprise suspending one or more operators, for example, the operator associated with the breakpoint may be suspended. Other operators may or may not be suspended. At tracepoints, data messages are intercepted and stored in a cache. Tracepoints may be, for example, activated at the same port as breakpoints. Both breakpoints and tracepoints are considered probe points.

Figure 6:
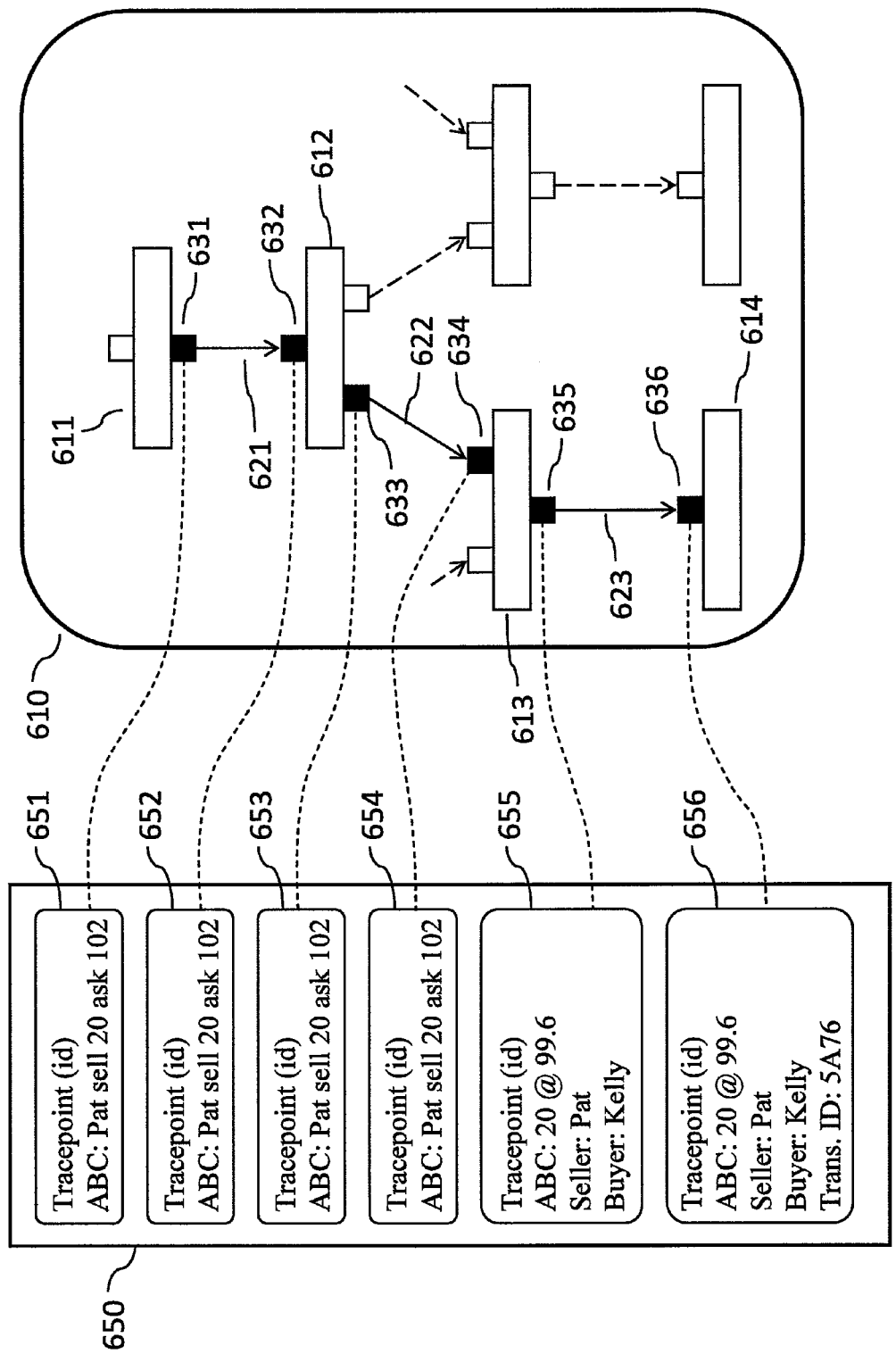
FIG. 6 is an application diagram illustrating tracing a message path through a portion of a flow-based application according to an embodiment of the invention.

FIG. 6 illustrates an example of tracing a message path through a portion of a flow-based application 610 according to an embodiment of the invention. The user activates tracing in a data message intercepted at a current breakpoint by setting the trace control in the debug directive to trace at all ports. The data-flow generated by this message will now be traced from the current breakpoint to a point of termination of the flow or until terminated by the user by, for example, a reset. The flow is traced from the current breakpoint. Alternatively, the user may activate tracing on a port, and trace all messages that subsequently traverse that port.

A trace directive is encoded in debug directives embodied in the current breakpoint trace message. A debugger message cache 650 comprises messages 651-656 observed at tracepoints 631-636, respectively, in the portion of a flow-based application 610 shown. The application comprises operator 611 have an output port tracepoint 631, operator 612 having an input port tracepoint 632 and an output port tracepoint 633, operator 613 having an input port tracepoint 634 and an output port tracepoints 635, and operator 614 having an input port tracepoint 636. The flow path of the portion of the application 610 comprises a first portion 621 originating at the output port of operator 611 (tracepoints 631) and terminating at the input port of operator 612 (tracepoints 632), a second portion 622 originating at the output port of operator 612 (tracepoints 633) and terminating at the input port of operator 613 (tracepoints 634), and a third portion 623 originating at the output port of operator 613 (tracepoints 635) and terminating at the input port of operator 614 (tracepoints 636).

In FIG. 6 the message path is traced and observed at every input port and every output port along the message path within the portion of the application 610. In another embodiment of the invention, the message path is selectively traced by constraining the trace by selecting only certain ports along the path to intercept or observe messages. The certain ports may be selected by, for example, (i) selecting some or all of the input ports along the message path, (ii) selecting some or all of the output ports along the message path, or (iii) selecting ports along the path according to the distance between the selected ports along the path (e.g., the number of nodes or the number of operators along the path). By way of example, referring to FIG. 6 messages may be monitored only at input ports 632, 634 and 636. In this example, the debugger message cache 650 would comprise only messages 652, 654 and 656. By way of another example, the path may be monitored at only at the input ports, as in the previous example, and also monitored at tracepoint 631 as a predetermined starting point for the trace. In this example, the debugger message cache 650 would comprise only messages 651, 652, 654 and 656.

Figure 7:
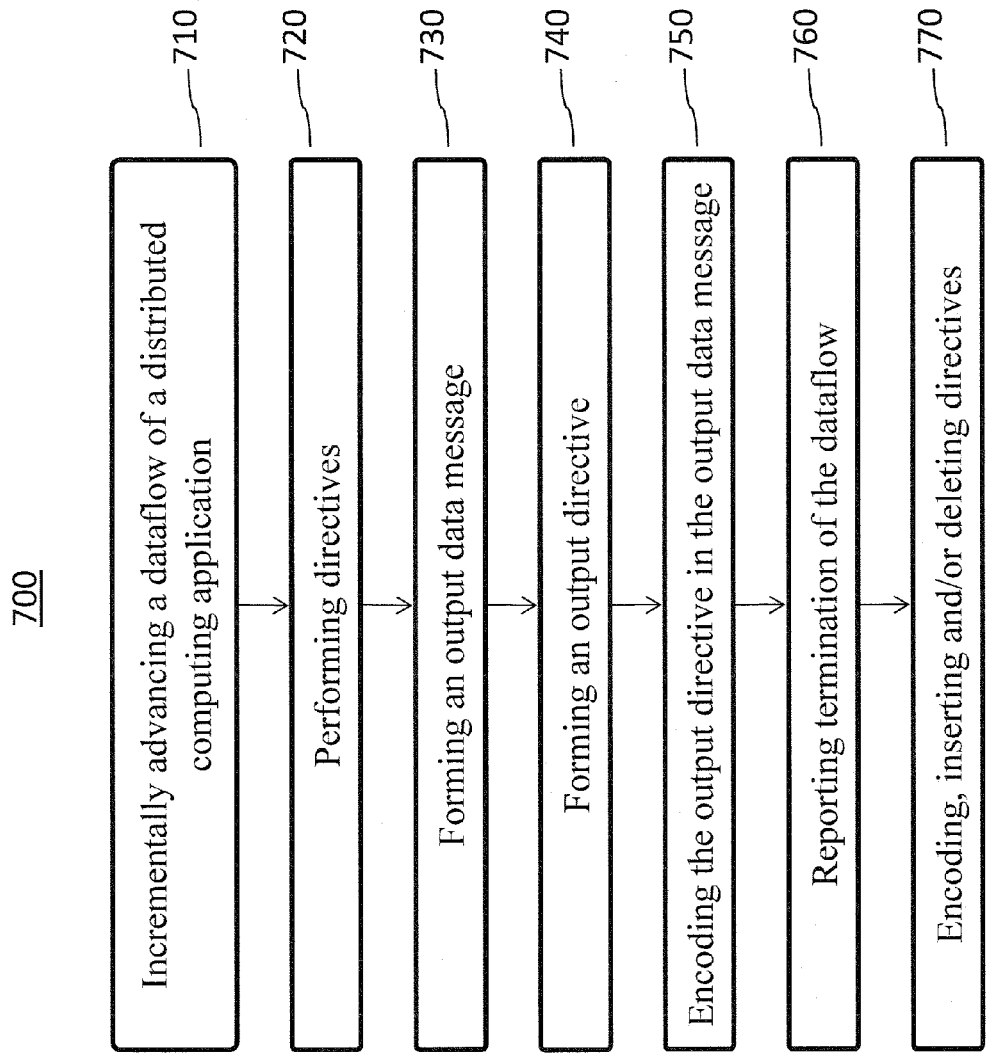
FIG. 7 is a flow diagram of a method for tracing dataflow in a distributed computing application comprising operators, one or more dataflow paths and data messages according to an embodiment of the invention.

FIG. 7 is a flow diagram of a method for tracing dataflow in a distributed computing application comprising operators, one or more dataflow paths and data messages according to an embodiment of the invention.

Step 710 comprises incrementally advancing the dataflow in a dataflow path of the one or more dataflow paths of the distributed computing application. Advancing the dataflow is according to directives encoded in the data messages. The directives may include, for example, a STNO directive operative to incrementally advance the dataflow to a next operator in the dataflow path, a STNP directive operative to incrementally advance the dataflow to a next port in the dataflow path and a reset directive operative to cancel a directive that is in the process of being merged by a merge operator. The dataflow path comprises operators, for example, merge operators (e.g., join operators and aggregate operators) and/or forwarding operators. The merge operator is operative to merge two or more data messages and merge the two or more directives. The forwarding operator is operative to forward data messages and forward directives according to rules for forwarding. Step 710 may be implemented, for example, as instruction code performed on a processor device.

Step 720 comprises performing the directives. The directives may, for example, enable dataflow-based debugging according to the incremental advancing of the dataflow and tracing of the data-paths. The directives may be encoded, merged and/or forwarded, for example, by the operators. Performing the directives may comprise, for example, intercepting, interpreting and carrying out the directives by a dataflow debugger. Step 720 may be implemented, for example, as instruction code performed on a processor device.

Step 730 comprises forming an output data message from two or more input data messages. The output data message is formed by an operator (e.g., a merge operator) and may be formed according to, for example, one or more directives contained in the two or more input data messages.

Step 740 comprises foaming an output directive from two or more input directives. The output data directive is formed by an operator (e.g., a merge operator) and may be formed according to one or more directives contained in the two or more input data messages. Specifies rules for merging, forwarding and reconciling debug directives, to yield a composite output directive, may be received from at least one of the input data messages. There may also be rules for a fan-out, in which the debug directive and data could be replicated in each of a plurality of output data messages.

Operations that combine data messages (e.g., join and aggregate operations) may exploit these rules to map multiple input directives to a single output directive. The rules for merging and forwarding the directives comprise merge rules by which operators which take as input two or more input data messages, each of which may contain a debug directive, and which generate a single directive embodied in the output data message. The rules for merging and forwarding the directives may further comprise a rule by which a reset debug directive cancels a debug directive that is in process of being merged by operators that join and aggregate data messages. At least because the rules for merging and forwarding the directives are used to form directives contained in an output message formed in step 730, the output message may considered to be formed according to the rules.

Step 750 comprises encoding the output directive formed in step 740 in the output data message formed in step 730. Steps 730, 740 and 750 may be performed by, for example, a join operator which implements a merge operation. A merge operation may be considered as comprising steps 730, 740 and 750. A merge operation may be, for example, a join operator or an aggregate operator. The join operator is operative to join multiple data messages and merge/reconcile multiple directives. The multiple data messages comprise the multiple directives and are input to the join operators. The aggregate operator is operative to aggregate multiple data messages and merge/reconcile multiple directives. The multiple data messages comprise the three or more directives and are input to the aggregate operator.

Step 760 comprises reporting termination of the dataflow when performing a directive and when a data message is discarded by an operator performing the directive.

Step 770 comprises encoding and/or inserting a directive into a data message and/or deleting a directive from a data message.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1A, 1B, 2A, 2B, 3A, 3B, 3C, 3D and 4-7, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1A, 1B, 2A, 2B, 3A, 3B, 3C, 3D and 4-7, can also include, as described herein, providing a system, wherein the system includes distinct modules (e.g., modules comprising software, hardware or software and hardware). By way of example only, the modules may include but are not limited to: (i) an incrementally advancing module operative to incrementally advancing the dataflow in a dataflow path according to directives encoded in data messages; (ii) a directive performing module operative to perform the directives; (iii) an output data message forming module operative to form an output data messages from two or more input messages; (iv) an output directive forming module operative to form an output directive from two or more input directives; and (v) an encoded module operative to encode the output directive in the output data message. These and other modules may be configured, for example, to perform the steps of described and illustrated in the context of FIGS. 1A, 1B, 2A, 2B, 3A, 3B, 3C, 3D and 4-7.

Figure 8:
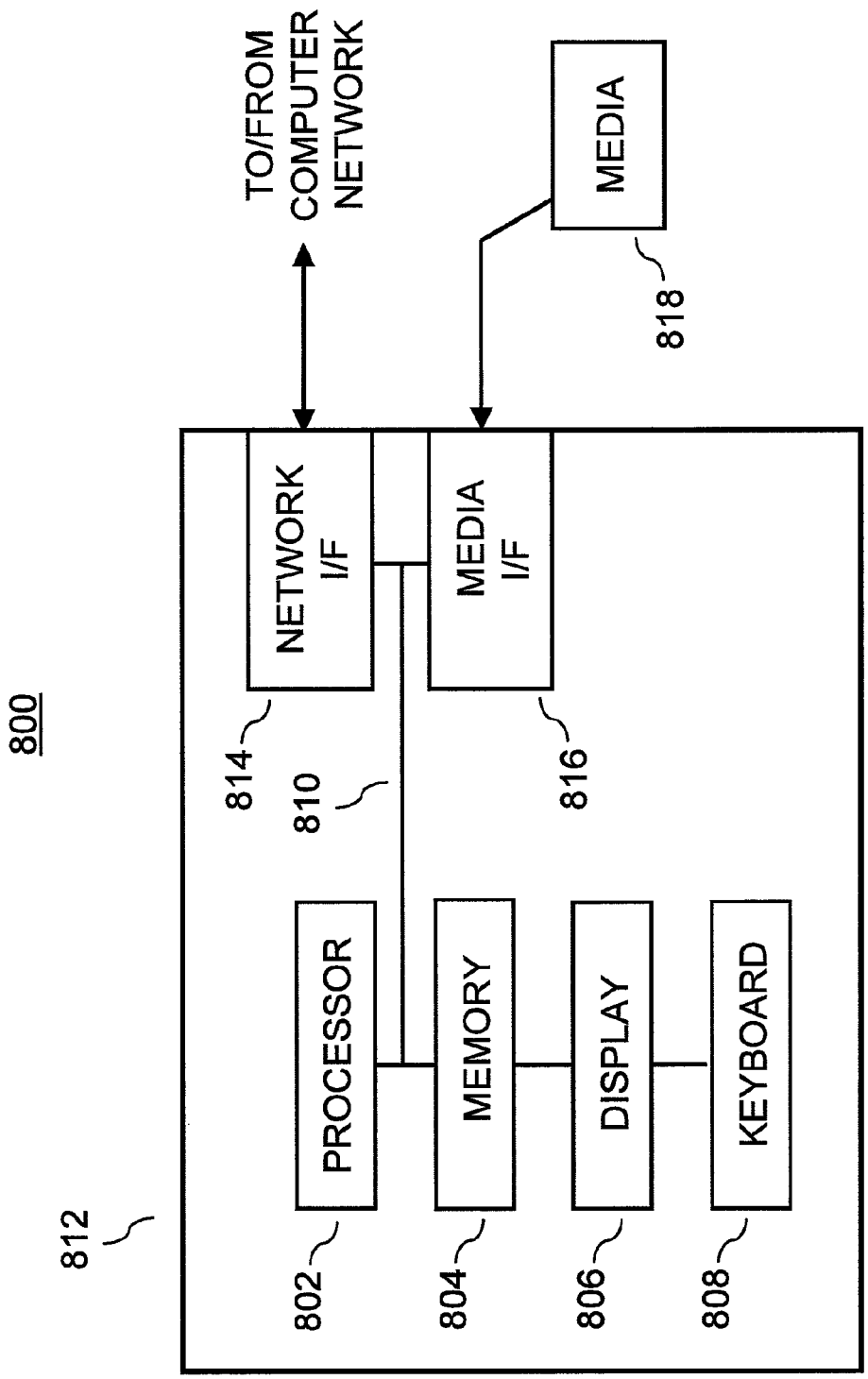
FIG. 8 depicts a computer system that may be useful in implementing one or more aspects and/or elements of the invention.

One or more embodiments can make use of software running on a general purpose computer or workstation. With reference to FIG. 8, such an implementation 800 employs, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 802, memory 804, and input/output interface such as display 806 and keyboard 808 can be interconnected, for example, via bus 810 as part of a data processing unit 812. Suitable interconnections, for example, via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 808, display 806, pointing device, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

It is understood that even though specific embodiments and examples presented herein relate to, for example, the dynamic pricing of a single resource, embodiments of the invention are not so limited. Techniques and embodiments of the invention may, for example, address dynamic pricing for a plurality of resources.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for tracing dataflow in a distributed computing application, comprising:
   incrementally advancing a dataflow in a dataflow path of one or more dataflow paths according to two or more directives encoded in two or more data messages of the distributed computing application where the dataflow is being traced, the dataflow path comprising one or more operators comprising at least one merge operator operative to:
   (i) combine the two or more data messages; and
   (ii) combine the two or more directives;
   performing the two or more directives;
   forming an output data message from at least two of the two or more messages;
   forming an output directive from at least two of the two or more directives; and
   encoding the output directive in the output data message,
   wherein the incrementally advancing of the dataflow comprises providing one or more directives of the two or more directives by inferring a relationship between one or more input ports and one or more output ports of an operator of the one or more operators according to inference rules associated with evaluating externally observable behavior of the operator, and
   wherein one or more of the incrementally advancing of the dataflow and the performing of the two or more directives are implemented as instruction code performed on a processor device.

2. The method of claim 1, wherein the one or more operators further comprise at least one forwarding operator operative to:
   (i) forward at least one of the two or more data messages; and
   (ii) forward at least one of the two or more directives.

3. The method of claim 1, wherein the two or more directives comprise at least one of:
   a step-to-next-operator directive operative to incrementally advance the dataflow to a next operator in the dataflow path; and
   a step-to-next-port directive operative to incrementally advance the dataflow to a next port in the dataflow path.

4. The method of claim 1, wherein the performing of the two or more directives comprises intercepting, interpreting and carrying out the two or more directives.

5. The method of claim 1, wherein the performing of the two or more directives is done by a flow-based debugger.

6. The method of claim 1, wherein the at least one merge operator is operative to merge the two or more directives according to rules for merging, and wherein the at least one merge operator is operative to merge the two or more data messages, producing a single output data message containing a merged debug directive.

7. The method of claim 1, wherein the at least one merge operator forms the output data message, forms the output directive and encodes the output directive in the output data message.

8. The method of claim 1, wherein the at least one operator further comprises a fanout operator operative to replicate at least a portion of at least one of the two or more data messages, thereby generating one or more additional data messages which each encode at least one of the two or more directives.

9. The method of claim 2, wherein the at least one forwarding operator is operative to forward the at least one of the two or more directives according to rules for forwarding, and wherein the forward operator is operative to forward the at least one of the two or more data messages according to the rules for forwarding.

10. The method of claim 1, wherein the two or more directives comprise at least one reset directive operative to cancel a directive that is in the process of being merged by one of the at least one merge operator.

11. The method of claim 1 further comprising at least one of:
   (i) encoding a directive of the two or more directives into a data message of the two or more data messages;
   (ii) inserting a directive of the two or more directives into a data message of the two or more data messages; and
   (iii) deleting a directive of the two or more directives from a data message of the two or more data messages.

12. The method of claim 1 further comprising reporting termination of the dataflow when performing a directive of the two or more directives and when a data message of the two or more data messages is discarded by an operator performing the directive.

13. The method of claim 12, wherein the directive of the two or more directives is one of a step-to-next-operator directive and a step-to-next-port directive.

14. The method of claim 1, wherein the inference rules comprise one of: (i) one or more temporal relationship; (ii) one or more data relationships; and
   a combination of one or more temporal relationships and one or more and data relationships.

15. A system for tracing dataflow in a distributed computing application, comprising:
   an incrementally advancing module operative to incrementally advance a dataflow in a dataflow path of one or more dataflow paths according to two or more directives encoded in two or more data messages of the distributed computing application where the dataflow is being traced, the dataflow path comprising one or more operators comprising at least one merge operator operative to:
   (i) merge the two or more data messages; and
   (ii) merge the two or more directives;
   a directive performing module operative to perform the two or more directives;
   an output data message forming module operative to form an output data message from at least two of the two or more messages;
   an output directive forming module operative to form an output directive from at least two of the two or more directives; and
   an encoded module operative to encode the output directive in the output data message,
   wherein the incrementally advancing module is further operative to provide one or more directives of the two or more directives by inferring a relationship between one or more input ports and one or more output ports of an operator of the one or more operators according to inference rules associated with evaluating externally observable behavior of the operator, and
   wherein the incrementally advancing module is implemented on a computer system comprising a memory and at least one processor coupled to the memory.

16. The system of claim 15, wherein the one or more operators further comprise at least one forwarding operator operative to:
   (i) forward at least one of the two or more data messages; and
   (ii) forward at least one of the two or more directives.

17. The system of claim 15, wherein the two or more directives comprise at least one of:
- a step-to-next-operator directive operative to incrementally advance the dataflow to a next operator in the dataflow path; and
- a step-to-next-port directive operative to incrementally advance the dataflow to a next port in the dataflow path.

18. Apparatus for tracing dataflow in a distributed computing application, comprising:
- a memory; and
- a processor coupled to the memory and configured to:
  - incrementally advance a dataflow in a dataflow path of one or more dataflow paths according to two or more directives encoded in two or more data messages of the distributed computing application where the dataflow is being traced, the dataflow path comprising one or more operators comprising at least one merge operator operative to:
    - (i) merge the two or more data messages; and
    - (ii) merge the two or more directives; and perform the two or more directives;
  - form an output data message from at least two of the two or more messages;
  - form an output directive from at least two of the two or more directives; and
  - encode the output directive in the output data message,
  - wherein the incrementally advancing of the dataflow comprises providing one or more directives of the two or more directives by inferring a relationship between one or more input ports and one or more output ports of an operator of the one or more operators according to inference rules associated with evaluating externally observable behavior of the operator.

19. An article of manufacture for tracing dataflow in a distributed computing application, the article of manufacture comprising a non-transitory computer readable storage medium having tangibly embodied thereon computer readable program code which, when executed, causes a computer to:
- incrementally advance a dataflow in a dataflow path of one or more dataflow paths according to two or more directives encoded in two or more data messages of the distributed computing application where the dataflow is being traced, the dataflow path comprising one or more operators comprising at least one merge operator operative to:
  - (i) merge the two or more data messages; and
  - (ii) merge the two or more directives; and perform the two or more directives;
- form an output data message from at least two of the two or more messages;
- form an output directive from at least two of the two or more directives; and
- encode the output directive in the output data message,
- wherein the incrementally advancing of the dataflow comprises providing one or more directives of the two or more directives by inferring a relationship between one or more input ports and one or more output ports of an operator of the one or more operators according to inference rules associated with evaluating externally observable behavior of the operator.

20. The article of claim 19, wherein the one or more operators further comprise at least one forwarding operator operative to:
- (i) forward at least one of the two or more data messages; and
- (ii) forward at least one of the two or more directives.

21. The article of claim 19, wherein the two or more directives comprise at least one of:
- a step-to-next-operator directive operative to incrementally advance the dataflow to a next operator in the dataflow path; and
- a step-to-next-port directive operative to incrementally advance the dataflow to a next port in the dataflow path.

22. The method of claim 1, wherein at least one of the two or more directives comprises a step-to-next-port directive operative to incrementally advance the dataflow to a next port in the dataflow path.

* * * * *